Nov. 12, 1968 P. H. KYDD 3,411,123
PYROLYTIC GRAPHITE ELECTRICAL RESISTANCE ELEMENT
Filed May 10, 1966
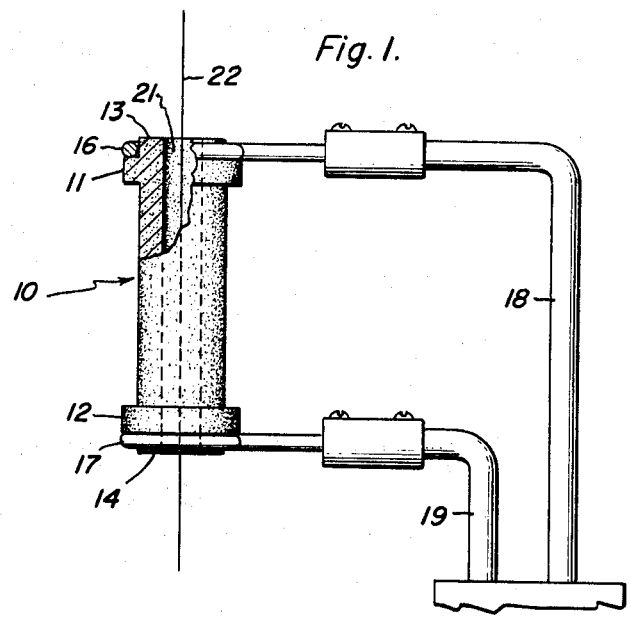
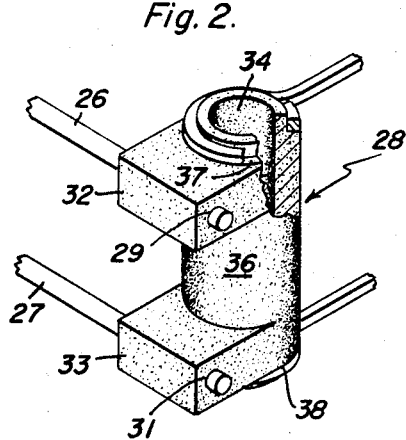
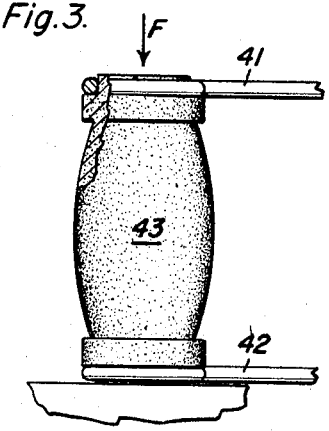
Inventor:
Paul H. Kydd,
by [signature]
His Attorney.

United States Patent Office 3,411,123
Patented Nov. 12, 1968

3,411,123
PYROLYTIC GRAPHITE ELECTRICAL
RESISTANCE ELEMENT
Paul H. Kydd, Scotia, N.Y., assignor to General Electric
Company, a corporation of New York
Filed May 10, 1966, Ser. No. 549,034
15 Claims. (Cl. 338—318)

ABSTRACT OF THE DISCLOSURE

A pyrolytic graphite electrical resistance element is described comprising a pyrolytic graphite body in combination with means for conducting electrical current to and away from the graphite body and with means for mechanically applying a compressive force to at least one end of the graphite body in the direction of the crystallographic "c" axis to prevent separation due to delamination of the graphite body, and the connections between the conducting means and the graphite body being such that electrical current in traversing the graphite body passes in the direction of the crystallographic "c" axis of the graphite body.

---

This invention is directed to carbon resistance heating elements and more particularly to an improvement in the construction of heating elements made of pyrolytic graphite.

Pyrolytic graphite is defined as a material made from carbonaceous gases by thermal decomposition thereof or from a carbonaceous material by the evaporation and deposition thereof on a surface. In pyrolytic graphite, planar graphite crystallites are arranged so that their layered structures are all substantially parallel to the deposition surface and to each other. During the thermal decomposition of carbonaceous gases, for example, carbon is removed from the gas with this carbon depositing on a substrate so that planar graphite crystallites are aligned into a layered structure. Single crystals of relatively large volume can be prepared in this manner. Methods for the preparation of pyrolytic graphite are described in U.S. Patents 3,107,180, 3,138,434, 3,138,435, Diefendorf, all of which patents are assigned to the assignee of this invention.

The aforementioned orientation of pyrolytic graphite provides a high anisotropy of electrical, structural, and thermal properties. Thus, pyrolytic graphite has a very low electrical and thermal conductivity across the layers and has very high values of electrical and thermal conductivity parallel to the layers.

Although the anisotropic nature of pyrolytic graphite is well known and certain aspects thereof have been utilized as, for example, for the polarization of electromagnetic radiation, for the construction of temperature sensitive devices and for the lining of reaction nozzles and reentry nose cones, there does not appear to have been any recognition in the art of the benefits to be gained by specifically utilizing the electrical anisotropy or the combined electrical and thermal anisotropies of this material in the preparation of electrical heating and lighting elements.

It is, therefore, a prime object of this invention to provide an electrical resistance configuration made of pyrolytic graphite of relatively thick cross-section to which electrical connections can be made in a simple manner to produce and maintain a preselected temperature distribution along the pyrolytic graphite by the introduction of electrical current thereto.

Another object of this invention is the provision of an electrical resistance configuration made of pyrolytic graphite adapted for receiving electrical connections, which connections need not be provided with auxiliary cooling means to obviate burnout.

It is a further object of this invention to provide a pyrolytic graphite electrical resistance element having a relatively thick cross-section wherein the electrical and thermal anisotropy of the pyrolytic graphite co-act to provide a temperature gradient varying along the graphite element according to a preselected pattern upon impressing an electrical current thereon.

The above and other objects are achieved by the practice of this invention wherein an electrical resistance device is provided comprising a pyrolytic graphite body in combination with means for conducting electrical current to and away from the graphite body and with means for mechanically applying a compressive force to at least one end of the graphite body in the direction of the crystallographic "c" axis to prevent separation due to delamination of the graphite body, and the connections between the conducting means and the graphite body being such that electrical current in traversing the graphite body passes in the direction of the crystallographic "c" axis of the graphite body.

When a pyrolytic graphite heater was first constructed to test the effectiveness of this concept of utilizing the electrical anisotropy of the graphite as described herein, the heater gradually delaminated during operation and electrical continuity was lost. Although the reason for the delamination causing this failure is unknown, it was decided to try to prevent separation due to it and this was successfully accomplished by the application of compressive force to the structure acting in the direction of the "c" axis.

Th exact nature of this invention as well as other objects and advantages thereof will be readily apparent from consideration of the following specification relating to the annexed drawing in which:

FIG. 1 is an elevational view partly in cross-section showing a pyrolytic graphite heater constructed in accordance with the teachings of this invention;

FIG. 2 is a view partly in section showing a second embodiment of a pyrolytic graphite heater constructed in accordance with this invention, and FIG. 3 shows an electrical resistance element, which element has an idealized configuration for uniform temperature along the length thereof.

FIG. 1 is an elevational view partially in cross-section showing a pyrolytic graphite heater 10 having a generally spool-like configuration. Shoulders 11 and 12, which are formed thereon define annular projections 13, 14 over which loops 16, 17 are received. These loops 16, 17 are supported in a resilient manner and are forcefully biased toward each other by mounting arms 18, 19 whereby a compressive force is constantly applied to the heater 10. In addition to providing this biasing compressive force to offset delamination these loops also are the means by which electrical current is brought to and conducted away from heater 10. The power leads and loops 16, 17 may be made of tantalum, for example, and the orientation of the pyrolytic graphite is such that the "c" axis extends in the direction of the longitudinal axis of heater 10.

Hole 21 extending through spool 10 serves as a furnace for the heat treatment of fibers, such as fiber 22 located therein and oscillated up and down. Temperatures in the range of from about 2200 to about 2300° C. were readily obtained at about 12 volts using about 35 amperes of current for a heater element having a barrel length of about ½" in length with a hole ⅛" in diameter.

Other means may be employed to exert the necessary compressive force, as for example, by applying a weight to the upper end of a vertically mounted resistance element or inserting the ends thereof, i.e. projections 13, 14 between closely-fitted fixed abutments such that the resistance element becomes rigidly restrained after a very small amount of thermal expansion during operation. Since power is the product of current times resistance and, further, since resistance is inversely proportional to the cross-sectional area of the pyrolytic graphite through which the current passes, the ends of the electrical resistance element can be made with sufficiently large area in cross-section to keep these portions relatively cool. The thermal anisotropy of the material minimizes heat transfer from the central portion of the length of pyrolytic graphite to the ends. The use of such a heater as a light source is particularly advantageous in spectroscopy wherein a black body light source is employed.

A scond embodiment is shown in FIG. 2 (also partially in cross-section) being different from the device in FIG. 1 in the method of attachment of the electrodes 26, 27 to the pyrolytic graphite element 28.

As may be seen the leads 26, 27 e.g. tungsten wire, fit within holes 29, 31 in projecting legs 32, 33. As in the case of the first embodiment, the hollow core 34 may be used as a furnace for the heat treatment of longitudinally extending materials extended therethrough.

Since the electric current flowing in tungsten rods 26, 27 is introduced into legs 32, 33 in a direction substantially perpendicular to the "c" axis of the pyrolytic graphite, in which direction the electrical resistance is comparatively low, and since the end regions at legs 32, 33 are relatively large in cross-sectional area and in the "c" direction, less heat is generated by resistance heating in these end regions such that these end regions remain at a considerably lower temperature than the temperature of the barrel portion 36 of heater 28 extending between the legs 32, 33. Further, as indicated earlier, the transmission of heat from barrel 36 to the end regions is minimized by the thermal anisotropy of the pyrolytic graphite. By the use of this construction, burnout of heating element 28 at the points of attachment of the leads is obviated. This consideration is particularly important in those installations in which the electrical connections cannot be independently cooled. Shoulder portions 37, 38 similar to shoulder 11, 12 in FIG. 1 are provided for receiving and axially aligning compression biasing means to counteract any delamination of the graphite structure.

Although barrel portion 36 is shown of constant diameter and of relatively short length, it may readily be seen that this cylindrical portion may be made of changing outer diameter in order to provide some selected variation in graphite cross-section for the passage of current therethrough in the "c" direction whereby a predetermined arbitrary temperature profile is made available along the length of the body of pyrolytic graphite. Likewise, the resistance element of pyrolytic graphite need not be made as a solid of revolution, although the machining thereof is considerably facilitated, but non-circular (or non-annular) cross-sections may be employed. Also, in the case of heaters, more than one hole may be employed to heat multiple work pieces simultaneously.

An example of the use of varying cross-section is shown in FIG. 3. Therein, the means for applying compressive force F is not specifically shown and electrical loop connections 41, 42 connecting to the far ends of heater 43 could be relied upon solely for electrical use or (as described in FIG. 1) both to apply force and to introduce electrical current. The particular configuration shown for heater 43 is actually intended to provide an optimized uniform temperature distribution therealong. The enlargement near the center of the barrel length is shown exaggerated for ease of illustration, but actually the change in cross-sectional area is only enough to compensate for such heat losses as will occur, which losses will be greater at the ends when the temperature gradient is greater. Other reasons may dictate any number of variations in the cross-sectional area and in case of a hollow resistance element the variation may be accomplished by varying the size of the hole along its length.

The use of this invention for incandescent light sources is also of considerable interest. Although pyrolytic graphite has been proposed for lamp filaments there has been no consideration of the novel arrangement proposed herein wherein the electric current passes in the "c" direction along the pyrolytic graphite. Rather, the deposition of the pyrolytic graphite to form the filament has always resulted in orientation such that the electric current passes substantially perpendicular to the "c" axis and to provide the necessary resistance for incandescence, the filament must be of small diameter and any evaporation thereof is critical. By using properly oriented pyrolytic graphite, on the contrary, a larger diameter filament can be used and still have enough resistance to reach incandescence with a reasonably small current, whereby evaporation will be much less cricital a problem.

In general the preparation of a resistance element involves the preparation of large slabs of pyrolytic graphite. It is then necessary only to cut out a portion of the slab considering, of course, that the "c" axis thereof must be parallel to the direction in which electrical current will flow in the completed resistance element. Next, the portion of pyrolytic graphite is machined to the proper dimensions with a lathe, saw, file, etc. Although the use of single pieces, or bodies, is preferred, however, for elements longer in length than can be cut from a single plate of pyrolytic graphite, short units can be be aligned, stacked, and placed under compression to achieve electrical continuity.

Various modifications are contemplated, such as means and manners for applying the requisite compressive biasing force, for example, and these modifications may be resorted to by those skilled in the art without departing from the spirit and scope of this invention, as hereinafter defined by the appended claims.

What I claim as new and desire to secure by Letters Patent of the United States is:

1. In an electrical resistance element to which electric connections are made for carrying electric current to and away therefrom, the improvement comprising the electrical resistance element being a longitudinally-extending pyrolytic graphite shape, the cross-sectional area of which varies along the length thereof and the "c" crystallographic axis thereof extends in the direction of electrical current traverse through said electrical resistance element.

2. The improvement substantially as recited in claim 1 wherein the cross sectional area of the pyrolytic graphite shape varies along the length thereof and biasing means adjacent at least one end of said pyrolytic graphite shape for applying a compressive force thereto in the general direction of the "c" axis.

3. The improvement substantially as recited in claim 1 wherein the pyrolytic graphite shape has at least one longitudinally-extending cavity passing therethrough in the direction of the "c" axis.

4. The improvement substantially as recited in claim 3 wherein the pyrolytic graphite shape is in the form of a cylinder.

5. The improvement substantially as recited in claim 1 wherein the pyrolytic graphite shape is in the form of a cylinder.

6. The improvement substantially as set forth in claim 2 wherein the means for applying compressive force also forms at least one of the electrical connections to the pyrolytic shape.

7. An electrical resistance device comprising in combination a longitudinally-extending pyrolytic graphite body, a plurality of electrical connections to said pyrolytic graphite body spaced along the length thereof, and means adjacent at least one end of said pyrolytic graphite body for applying compressive force thereto.

8. The electrical resistance device substantially as recited in claim 7 wherein the configuration of the pyrolytic graphite body orients the "c" axis along the length of said pyrolytic graphite body.

9. The electrical resistance device substantially as recited in claim 7 wherein the means for applying compressive force is spring-biased.

10. The electrical resistance device substantially as recited in claim 7 wherein the pyrolytic graphite body is in the form of a hollow solid of revolution.

11. The electrical resistance device substantially as recited in claim 7 wherein the cross-section of the pyrolytic graphte body varies along the length thereof.

12. An electrical resistance device comprising in combination a longitudinally-extending pyrolytic graphite body and means adjacent each end of said pyrolytic graphite body for simultaneously completing electrical connections and applying compressive force thereto.

13. The electrical resistance device substantially as recited in claim 12 wherein the means for simultaneously completing electrical connections and applying compressive force comprises a pair of spring-connected loops.

14. The electrical resistance device substantially as recited in claim 12 wherein the pyrolytic graphite body is in the form of a hollow solid of revolution.

15. The electrical resistance device substantially as recited in claim 14 wherein the solid of revolution is a cylinder.

References Cited

UNITED STATES PATENTS 483,758  10/1892  Appleyard ---------- 338—262

OTHER REFERENCES

Pyrolytic Graphite Engineering Handbook, July 15, 1963 General Electric, p. 1, 2, 3 and 14 copy in 338–334.

Dummer, G. W., Fixed Resistors, Pitman, London, 1956, pp. 86–87, TK 7872, R4D8.

General Electric brocure Pyrolytic Graphite, copy in 338–225.

LEWIS H. MYERS, *Primary Examiner.*

ELLIOTT A. GOLDBERG, *Assistant Examiner.*